United States Patent [19]

Ukita et al.

[11] 4,309,330

[45] Jan. 5, 1982

[54] COPOLYMER EMULSION

[75] Inventors: Ryoji Ukita; Takao Hirayama, both of Hitachi, Japan

[73] Assignee: Hitachi Chemical Company Ltd., Tokyo, Japan

[21] Appl. No.: 236,225

[22] Filed: Feb. 19, 1981

[51] Int. Cl.$^3$ .............................................. C08F 265/04
[52] U.S. Cl. .......................... 260/29.7 H; 260/29.7 T; 525/278; 525/374
[58] Field of Search ...................... 260/29.6 H, 29.7 H, 260/29.7 T, 23 AR, 23.5 R; 526/282; 525/278, 374

[56] References Cited

U.S. PATENT DOCUMENTS

| | | | |
|---|---|---|---|
| 4,100,133 | 7/1978 | Emmons | 260/45.9 L |
| 4,131,580 | 12/1978 | Emmons | 260/29.6 H |
| 4,144,212 | 3/1979 | Linder | 260/29.7 H |
| 4,197,225 | 4/1980 | Emmons | 260/23 AR |

Primary Examiner—Paul R. Michl
Attorney, Agent, or Firm—Craig and Antonelli

[57] ABSTRACT

A copolymer emulsion comprising (I) a copolymer obtained by copolymerizing (A) a dicyclopentadiene derivative, (B), an $\alpha,\beta$-unsaturated monomer having one or more OH groups, (C) an $\alpha,\beta$-unsaturated monomer copolymerizable with the components (A) and (B), followed by the reaction of the resulting copolymer with (D) a partial allyl ether of polyhydric alcohol having one or more terminal isocyanate groups, and (II) water can be cross-linked and cured at normal temperatures to give coating films particularly excellent in hardness, water resistance, corrosion resistance and solvent resistance.

9 Claims, No Drawings

COPOLYMER EMULSION

BACKGROUND OF THE INVENTION

This invention relates to a copolymer emulsion, more particularly to an aqueous acrylic copolymer emulsion which can be cross-linked and cured by the oxygen in the air by adding a metal dryer thereto.

Recently, aqueous resins have been noticed from the viewpoint of causing no environmental pollution and saving resources. Particularly, aqueous emulsions are hopeful as coating resins, since they hardly use organic solvents, organic amines and the like. But almost aqueous emulsions contain thermoplastic resins, so that properties of coating film obtained therefrom are very inferior to those of coating film obtained from organic solvent-based resins, for example, in hardness, resistance to solvent, resistance to water, resistance to corrosion, and the like. Aqueous emulsions containing thermosetting resins have been developed but are not sufficient as general purpose coating resins, since in almost cases heating at a temperature of 130° to 180° C. or higher is necessary.

On the other hand, oxidation polymerization type alkyd emulsions are commercially available. But the alkyd emulsions are insufficient in drying at initial periods and further have problems in properties of coating film after cured, particularly in hardness and resistance to contamination.

SUMMARY OF THE INVENTION

It is an object of this invention to provide an acrylic copolymer emulsion which can be cross-linked and cured at normal temperatures or by baking at lower temperatures for a short period of time.

The present inventors have found that acrylic emulsions which can be cured at normal temperatures or lower temperatures (about 20° to 80° C.) with heating for a short period of time can be obtained by using a copolymer produced by introducing an allyl group into an acrylic copolymer obtained by copolymerizing a dicyclopentadiene derivative such as dicyclopentadiene acrylate or methacrylate or the like and accomplished this invention.

This invention provides a copolymer emulsion comprising (I) a copolymer obtained by copolymerizing (A) a dicyclopentadiene derivative of the formula:

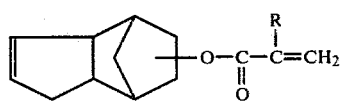
(1)

wherein R is hydrogen, halogen or a lower alkyl group, in an amount of 2 to 30 parts by weight, (B) an α,β-unsaturated monomer having one or more hydroxyl groups in an amount of 3 to 20 parts by weight, and (C) an α,β-unsaturated monomer copolymerizable with the components (A) and (B) in an amount sufficient for making the total amount of the components (A), (B) and (C) 100 parts by weight, followed by the reaction of the resulting copolymer with (D) a partial allyl ether of polyhydric alcohol having one or more terminal isocyanate groups obtained by reacting a partial allyl ether of polyhydric alcohol with a diisocyanate in an amount of 2 to 20 parts by weight, and (II) water.

The coating film obtained from the copolymer emulsion of this invention has the same or more excellent properties in water resistance, solvent resistance, corrosion resistance, weather resistance and the like compared with those obtained from conventional organic solvent-based resins.

DESCRIPTION OF THE PREFERRED EMBODIMENTS

Examples of the dicyclopentadiene derivative of the formula (1), the component (A), are dicyclopentenyl acrylate, dicyclopentenyl methacrylate, dicyclopentenyl α-chloroacrylate, and the like. These dicyclopentadiene derivatives can be used alone or as a mixture thereof.

The component (A) is used in an amount of 2 to 30 parts by weight. When the amount is less than 2 parts by weight, curability becomes insufficient, while when the amount is more than 30 parts by weight, coating film becomes brittle (that is, poor in flexibility). Preferred amount is 5 to 10 parts by weight.

The component (A) having the formula (1) has the

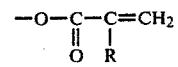

group at the 8 or 9 position of the ring when numbered as follows:

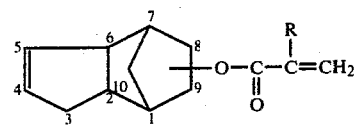

The lower alkyl represented by R is preferably that having 1 to 6 carbon atoms, such as methyl, ethyl, propyl, butyl, isopropyl, isobutyl, etc., and methyl is particularly preferable. The halogen represented by R includes chlorine, etc., and chlorine is particularly preferable.

The dicyclopentadiene derivative of the formula (1) can be prepared by addition reaction of dicyclopentadiene with a carboxylic acid of the formula:

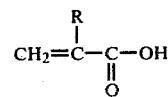
(2)

wherein R is as defined above, or esterification reaction of a compound of the formula:

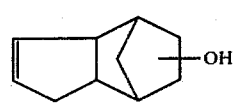
(3)

wherein the OH group is attached to the 8 or 9 position, with a carboxylic acid of the formula (2).

Examples of the component (B) are β-hydroxylethyl acrylate, β-hydroxyethyl methacrylate, β-hydroxypropyl acrylate, β-hydroxypropyl methacrylate, 1,4- butanediol monoacrylate, 1,4-butanediol monomethacrylate, 1,6-hexanediol monoacrylate, 1,6-hexanediol monomethacrylate, and the like. These $\alpha,\beta$-unsaturated monomers can be used alone or as a mixture thereof.

The component (B) is used in an amount of 3 to 20 parts by weight. When the amount is less than 3 parts by weight, the reaction with the component (D) becomes insufficient, while when the amount is more than 20 parts by weight, a bad influence is given to water resistance of the coating film obtained.

Examples of the component (C) are unsaturated carboxylic acids such as acrylic acid, methacrylic acid, maleic acid, fumaric acid, crotonic acid, and the like; acrylic esters such as methyl acrylate, ethyl acrylate, n-propyl acrylate, isobutyl acrylate, 2-ethylhexyl acrylate, butyl acrylate, and the like; methacrylic esters such as methyl methacrylate, ethyl methacrylate, n-propyl methacrylate, n-butyl methacrylate, isobutyl methacrylate, 2-ethylhexyl methacylate, and the like; styrene series monomers such as stylene, vinyltoluene, $\beta$-methylstyrene, chlorostyrene and the like; other monomers such as vinyl acetate, vinyl propionate, glycidyl acrylate, glycidyl methacrylate, acrylonitrile, methacrylonitrile, n-methylolacrylamide, n-butoxymethylacrylamide, and the like. These copolymerizable $\alpha,\beta$-unsaturated monomers can be used alone or as a mixture thereof.

When an unsaturated carboxylic acid is used as the component (C), it is preferable to use it in an amount of 4 parts by weight or less, more preferably 1 to 2 parts by weight based on 100 parts by weight of the total amount of the components (A), (B) and (C).

Preferable examples of the component (D) are those obtained by reacting partial allyl ethers of polyhyric alcohols having one remaining hydroxyl group with diisocyanates so as to react the hydroxyl group of the above-mentioned partial allyl ethers of polyhydric alcohols with the isocyanate group of the diisocyanates to form urethane linkage while retaining one terminal isocyanate group. Examples of the partial allyl ethers of polyhydric alcohols are monallyl ethers of dihydric alcohols such as ethylene glycol monoallyl ether, diethylene glycol monoallyl ether, propylene glycol monoallyl ether, 1,4-butanediol monoallyl ether, 1,6-hexanediol monoallyl ether, etc.; diallyl ethers of trihydric alcohols such as trimethylolethane diallyl ether, trimethylolpropane diallyl ether, glycerine diallyl ether, etc.; triallyl ethers of tetrahydric alcohols such as pentaerythritol triallyl ether, etc. Examples of the diisocyanates are tolylene diisocyanate, xylylene diisocyanate, hexamethylene diisocyanate, diphenylmethane diisocyanate, tetramethylene diisocyanate, and the like. Among these compounds, a compound obtained by bonding one molecule of trimethylol propane diallyl ether with one molecule of tolylene diisocyanate is particularly preferable. These compounds as the component (D) can be used alone or as a mixture thereof.

The component (D) is used in an amount of 2 to 20 parts by weight. When the amount is less than 2 parts by weight, cross-linking becomes insufficient, while when the amount is more than 20 parts by weight, drying at initial periods becomes poor. More preferable amount of the component (D) is 5 to 15 parts by weight.

As the component (D), there can also be used a reaction product obtained by reacting a partial allyl ether of polyhydric alcohol having two or more remaining hydroxyl groups with a polyvalent isocyanate such as a diisocyanate, but the above-mentioned reaction products are more preferable.

As mentioned above, as the component (D), those having one terminal isocyanate group are preferable. Such compounds can preferably be obtained by reacting a partial allyl ether of polyhydric alcohol with a diisocyanate in equivalent ratio of the OH group of the former to the NCO group of the latter (OH/NCO) in the range of 1/2 to 1/2.2. When the equivalent ratio is more than 1/2, the unreacted diisocyanate becomes easily retained, while when the equivalent ratio is less than 1/2.2, the amount of a compound obtained by bonding the partial allyl ether of polyhydric alcohol to both terminals of the diisocyanate through urethane linkage unpreferably increases.

Further, as the partial allyl ethers of polyhydric alcohols, those having one hydroxyl group in the molecule in an amount of 90% by weight or more and those having two or more hydroxyl groups in the molecule in an amount of 10% by weight or less are preferable. When the amount of partial allyl ether of polyhydric alcohol having two or more hydroxyl groups in the molecule is in excess, it becomes difficult to attain the objects of this invention.

The copolymer emulsion of this invention can be obtained, for example, by using conventional polymerization techniques. In the case of emulsion polymerization of the components (A), (B) and (C), there may be used polymerization temperature of 0° C. to 100° C., preferably 50° to 80° C. As polymerization catalyst, those liberating free radicals can be used. Among these catalysts, redox catalysts such as potassium persulfate, sodium metabisulfite, and the like are remarkably effective. These redox catalysts can be used in an amount of 0.05 to 2% by weight, preferably 0.2 to 5% by weight based on the total weight of the components (A), (B) and (C). As emulsifier, it is possible to use one or more anionic surface active agents, cationic surface active agents, nonionic surface active agents and amphoteric surface active agents. It is also possible to use one or more protective colloids such as polyvinyl alcohol, starch, dextrin, methyl cellulose, carboxymethylcellulose, and the like. The use of emulsifiers is not essential but in general preferable. The emulsifiers are used in an amount of preferably 0.1 to 5% by weight based on the total weight of the components (A), (B) and (C). It is possible to use carbon tetrachloride, a mercaptan, an organic solvent for regulating the molecular weight of the copolymer. The copolymer produced by the emulsion polymerization unusally has a pH of 2 to 6, since an acidic catalyst is used or in some cases carboxyl groups are present in the copolymer obtained.

The component (D) can be added to the copolymer thus produced and having a pH of 2 to 6 for the further reaction. But the addition of the component (D) to the copolymer after the pH of the copolymer is made neutral or alkaline by adjusting the pH to about 7 to 10 is preferable for increasing stability of the resulting emulsion. As the alkaline substance for making the copolymer neutral or alkaline, there can be used ammonia water, dimethylamine, triethylamine, morpholine, triethanolamine, dimethylaminoethanol, and the like.

The reaction of the isocyanate group of the component (D) with the hydroxyl group of the copolymer obtained from the components (A), (B) and (C) can be carried out by adding the component (D) to the copolymer after the above-mentioned emulsion polymerization at a temperature of 60° to 80° C. for about 2 to 6 hours. The amount of water to be used in this reaction is not particularly limited but is preferable when the solids content becomes 70% by weight or less, more preferably 40 to 60% by weight. When the solids content is too much, stability of the emulsion becomes poor.

The copolymer emulsion of this invention can also be obtained by a coventional solution polymerization of the components (A), (B) and (C) by using an aqueous organic solvent such as that containing no hydroxyl group, e.g., ethylene glycol ethyl ether, ethylene glycol methyl ether acetate, ethylene glycol butyl ether acetate, etc., and a catalyst such as an azobis compound, e.g., azobisisobutyronitrile, or a peroxide, e.g., benzoyl peroxide, di-tert-butyl peroxide, lauroyl peroxide, followed by the reaction with the component (D) and emulsification by adding water and an emulsifier. The catalyst mentioned above can be used in an amount of 0.5 to 2% by weight based on the total weight of the components (A), (B) and (C). When the polymerization is carried out by using an organic solvent, it is preferable to use the organic solvent in an amount so as to make the solids content 50% by weight or less, preferably 25 to 40% by weight after adding water and so as to make the amount of organic solvent equal to or less than that of water.

The copolymer emulsion of this invention may contain one or more metal driers such as cobalt naphthenate, lead naphthenate, zinc naphthenate, zirconium naphthenate, cobalt octoate, lead octoate, zinc octoate, zirconium octoate, and the like to give temperature-curable emulsion coatings. The amount of the metal dryer to be added is as the metal amount 0.01 to 1 part by weight per 100 parts by weight of the solids content of the resin (copolymer). In some cases, the polymer emulsion of this invention may contain one or more peroxides such as t-butyl peroxyoctoate, benzoyl peroxide, t-butyl peroxybenzoate, and the like in an amount of 1 part by weight or less per 100 parts by weight of the solids content of the resin.

The emulsion coating compositions mentioned above can be used as they are or can contain one or more pigments, plasticizers, solvents, colorants, and the like conventional additives and/or one or more water-soluble or water-dispersible resins in a wide range such as modified amino resins, epoxy resins, acrylic resins and the like.

The copolymer emulsion of this invention can be used for preparing coating compositions by adding one or more pigments, surface treating agents, organic solvents, and the like.

The coating compositions can be coated on surfaces of wood, paper, fibers, plastics, ceramics, iron, non-ferrous metals and the like materials by using conventional coating methods such as dipping, brushing, spray coating, roll coating, and the like.

This invention is illustrated by way of the following examples in which all parts and percents are by weight unless otherwise specified.

EXAMPLE 1

In a flask equipped with a stirrer, a thermometer, a reflux condenser, a dropping funnel and an inert gas introducing pipe, 100 g of demineralized water and 1 g of sodium lauryl sulfate were placed and the temperature of the flask was raised to 70° to 80° C. under ntirogen stream. Then a liquid (a) dissolving 0.5 g of ammonium persulfate in 20 g of water and a liquid (b) obtained by mixing 5 g of dicyclopentenyl methacrylate, 5 g of α-hydroxyethyl methacrylate, 39 g of methyl methacrylate, 50 g of butyl acrylate and 1 g of acrylic acid were separately added in dropwise for 2 hours. The flask was always maintained at 70° to 80° C. and the reaction was continued for additional 2 hours after the completion of the dropwise addition to complete the polymerization. The conversion was 98% or more. The acrylic copolymer emulsion thus obtained was adjusted to pH 7 by using ammonia water. To the resulting emulsion, a liquid containing 5 g of a reaction product obtained by reacting 1 mole of trimethylolpropane diallyl ether with 1 mole of tolylene diisocyanate was added gradually and the reaction was carried out at 60° C. for 4 hours. The resulting emulsion had a solids content of 46% and a viscosity of 35 poises at 25° C. by using a B type rotational viscometer.

EXAMPLE 2

An acrylic copolymer emulsion was prepared in the same manner as described in Example 1 by using 10 g of dicyclopentenyl methacrylate, 5 g of β-hydroxyethyl methacrylate, 34 g of methyl methacrylate, 50 g of butyl acrylate and 1 g of acrylic acid. The conversion was 98% or more. To the resulting emulsion, a liquid containing 10 g of a reaction product obtained by reacting 1 mole of trimethylolpropane diallyl ether with 1 mole of tolylene diisocyanate was added gradually and the reaction was carried out in the same manner as described in Example 1 to give a room-temperature-curable acrylic copolymer emulsion. The resulting emulsion had a solids content of 48% and a viscosity of 52 poises at 25° C.

COMPARATIVE EXAMPLE 1

An acrylic copolymer emulsion was prepared in the same manner as described in Example 1 by using 49 g of methyl methacrylate, 50 g of butyl acrylate and 1 g of acrylic acid. The pH of the resulting emulsion was adjusted to 8 by using ammonia water. (But the emulsion was not reacted with a liquid containing a reaction product obtained by reacting trimethylolpropane diallyl ether and tolylene diisocyanate.) The resulting emulsion had 44.5% of solids content and a viscosity of 42 poises at 25° C.

COMPARATIVE EXAMPLE 2

A copolymer emulsion was prepared in the same manner as described in Example 1 by using 10 g of dicyclopentenyl methacrylate, 5 g of β-hydroxyethyl methacrylate, 34 g of methyl methacrylate, 50 g of butyl acrylate and 1 g of acrylic acid. The pH of the resulting emulsion was adjusted to 8 by using ammonia water. The resulting emulsion had 44.8% of solids content and a viscosity of 18 poises at 25° C.

COMPARATIVE EXAMPLE 3

An acrylic copolymer emulsion was prepared in the same manner as described in Example 1 by using 5 g of β-hydroxyethyl methacrylate, 44 g of methyl methacrylate, 50 g of butyl acrylate and 1 g of acrylic acid. The conversion was 98% or more. The pH of the resulting emulsion was adjusted to 7 by using ammonia water. To the resulting emulsion, a liquid containing 10 g of a reaction product obtained by reacting 1 mole of trimethylolpropane diallyl ether and 1 mole of tolylene diisocyanate was added gradually and the reaction was carried out at 60° C. for 4 hours. The resulting emulsion had 46.8% of solids content and a viscosity of 63 poises at 25° C.

Using the emulsions obtained in Examples 1 and 2, and Comparative Examples 1 to 3, coating compositions were prepared and properties of coating films obtained therefrom were tested. The results were as shown in Table 1.

TEST CONDITIONS

Drying: at room temperature for 7 days.

Drying properties: a time required for drying at room temperature.

Film thickness: 30 to 40 microns.

Metal drier: a mixture of 0.5 part of lead naphthenate and 0.5 part of cobalt naphthenate was added to the copolymer emulsions obtained in Examples 1 and 2 and Comparative Examples 2 and 3 individually per 100 parts of the solids content of the resin (copolymer).

Peroxide: a 40% toluene solution of cyclohexanone peroxide was added to the copolymer emulsion obtained in Examples 1 and 2 and Comparative Example 3 in an amount of 0.1 part as the weight of cyclohexanone peroxide per 100 parts of the solids content of the copolymer.

Substrate: non-treated stainless steel plates.

TABLE 1

| Film properties | Resin | | | | |
|---|---|---|---|---|---|
| | Example 1 | Example 2 | Comparative Example 1 | Comparative Example 2 | Comparative Example 3 |
| Drying properties (min) | 13 | 13 | 13 | 13 | 15 |
| Pencil hardness | 2B | B | 3B | 2B | 3B |
| Solvent resistance (xylol) (number of rubbing) | 40 | >50 | 10 | 15 | 10 |
| Water resistance (dipping in water at 40° C. for 48 hours) | No change | No change | Partial blisters | Partial blisters | Partial blisters |
| Corrosion resistance (salt spraying for 72 hours) | Partial rusting | No change | Rusting on whole surface | Partial rusting | Rusting on whole surface |

As is clear from Table 1, the aqueous copolymer emulsions which can be cured at normal temperatures according to this invention can be obtained by introducing allyl groups into copolymers obtained by copolymerizing the dicyclopentadiene derivative of the formula (1). The copolymer emulsions of this invention can give coating films excellent in hardness, water resistance, corrosion resistance and solvent resistance compared with conventional thermoplastic acrylic emulsions. Further the coating films obtained from the copolymer emulsions of this invention are excellent in drying properties and hardness compared with those obtained from conventional oxidation curing type alkyd emulsions and in corrosion resistance and solvent resistance compared with other curing type acrylic emulsions.

What is claimed is:

1. A copolymer emulsion comprising (I) a copolymer obtained by copolymerizing (A) a dicyclopentadiene derivative of the formula:

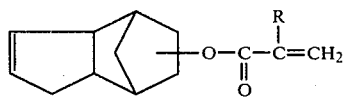

wherein R is hydrogen, halogen or a lower alkyl group, in an amount of 2 to 30 parts by weight, (B) an α,β-unsaturated monomer having one or more hydroxyl groups in an amount of 3 to 20 parts by weight, and (C) an α,β-unsaturated monomer copolymerizable with the components (A) and (B) in an amount sufficient for making the total amount of the components (A), (B) and (C) 100 parts by weight, followed by the reaction of the resulting copolymer with (D) a partial allyl ether of polyhydric alcohol having one or more terminal isocyanate groups obtained by reacting a partial allyl ether of polyhydric alcohol with a diisocyanate in an amount of 2 to 20 parts by weight, and (II) water.

2. A copolymer emulsion according to claim 1, wherein the component (D) is a reaction product obtained by reacting a partial allyl ether of polyhydric alcohol with a diisocyanate in equivalent ratio of the OH group of the former to the NCO group of the latter in the range of 1/2 to 1/2.2.

3. A copolymer emulsion according to claim 1 or 2, wherein the partial allyl ether of polyhydric alcohol has one hydroxyl group in the molecule.

4. A copolymer emulsion according to claim 3, wherein the partial allyl ether of polyhydric alcohol is a monoallyl ether of dihydric alcohol, a diallyl ether of trihydric alcohol or a triallyl ether of tetrahydric alcohol.

5. A coploymer emulsion according to claim 1, wherein the component (A) is dicyclopentenyl methacrylate, dicyclopentyl acrylate, dicyclopentenyl α-chlorocylate, or a mixture thereof.

6. A copolymer emulsion according to claim 1, wherein the component (B) is β-hydroxyethyl acrylate or β-hydroxyethyl methacrylate.

7. A copolymer emulsion according to claim 1, wherein the component (D) is a reaction product of trimethylolpropane diallyl ether with tolylene diisocyanate in 1:1 eqivalent ratio.

8. A copolymer produced by copolymerizing (A) a dicyclopentadiene derivative of the formula:

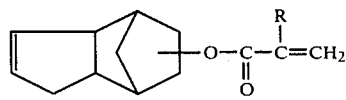

wherein R is hydrogen, halogen or a lower alkyl group, in an amount of 2 to 30 parts by weight, (B) an α,β-unsaturated monomer having one or more hydroxyl groups in an amount of 3 to 20 parts by weight, and (C) an α,β-unsaturated monomer copolymerizable with the components (A) and (B) in an amount sufficient for making the total amount of the components (A), (B) and (C) 100 parts by weight, followed by the reaction of the resulting copolymer with (D) a partial allyl ether of polyhydric alcohol having one or more terminal isocyanate groups obtained by reacting a partial allyl ether of polyhydric alcohol with a diisocyanate in an amount of 2 to 20 parts by weight.

9. A copolymer according to claim 8, wherein the component (A) is dicyclopentadiene methacrylate, the component (B) is β-hydroxyethyl methacrylate, the component (C) is methyl methacrylate, butyl acrylate, acrylic acid or a mixture thereof, and the component (D) is a reaction product of trimethylolpropane diallyl ether with tolylene diisocyanate in 1:1 equivalent ratio.

* * * * *